United States Patent [19]

Franke

[11] 4,422,079
[45] Dec. 20, 1983

[54] TIME RECORDER REGISTRATION APPARATUS

[75] Inventor: George Franke, Amherst, N.H.

[73] Assignee: Simplex Time Recorder Co., Gardner, Mass.

[21] Appl. No.: 236,392

[22] Filed: Feb. 20, 1981

[51] Int. Cl.³ ............................................. G01D 15/04
[52] U.S. Cl. ....................................... 346/1.1; 346/85; 346/96
[58] Field of Search ....................... 346/85, 96, 1.1, 77, 346/86–92, 80–84, 94–101; 83/30, 33, 660; 72/325, 326

[56] References Cited

U.S. PATENT DOCUMENTS

| 1,260,706 | 3/1918 | Peirce | 235/432 |
| 1,731,550 | 10/1929 | Streckfuss | 346/85 |
| 2,728,316 | 12/1955 | Oberg et al. | 72/326 |
| 2,779,408 | 1/1957 | Miller et al. | 83/33 |
| 3,133,785 | 5/1964 | Ahlberg et al. | 346/85 |
| 3,203,079 | 8/1965 | Smith et al. | 72/326 X |
| 3,438,310 | 4/1969 | Woodruff et al. | 83/33 X |
| 3,789,424 | 1/1974 | Majorino | 346/95 |

FOREIGN PATENT DOCUMENTS

| 525681 | 9/1940 | United Kingdom | 346/86 |
| 739005 | 10/1955 | United Kingdom | 346/83 |
| 874471 | 8/1961 | United Kingdom | 346/86 |

*Primary Examiner*—G. Z. Rubinson
*Assistant Examiner*—W. J. Brady
*Attorney, Agent, or Firm*—Seidel, Gonda & Goldhammer

[57] ABSTRACT

An apparatus for registering cards for printing in time recorders and the like uses a punch and die to form perforations which are co-linear with the printed information on the card. The perforations are sensed on subsequent insertions of the card and are used to prevent further insertion of the card and register the card in position so that each printing on the card will be made below previous printings.

9 Claims, 5 Drawing Figures

TIME RECORDER REGISTRATION APPARATUS

BACKGROUND OF THE INVENTION

The present invention relates to an improved manner of placing registration marks in time cards for consecutive time clocks and sensing the registration marks to properly position the card for subsequent printings.

Time recorders (or "time clocks") have long been used by employers to record the hours worked by employees. Typically, each employee is given a card to be inserted into the time clock when beginning and ending a work period. The time of day is printed on the card each time the card is inserted in the time clock so that total elapsed time may be deduced from the successive printings.

In order for the time information recorded on the card to be intelligible, each printing must be displaced in some manner from previous printings. This may be done by moving the printing means relative to the card, or by maintaining the printing means in a fixed location while varying the position of the card relative to the printing means. Many time clocks employ the latter approach. Such clocks usually print time from the top of the card down, and are known as consecutive time clocks.

In consecutive time clocks, a circular hole is punched in the card at the same time the time of day is printed on the card. The hole is usually on the same line as the printing. On the next insertion of the card into the clock, this hole is used to sense the location of the last printing and to stop further insertion of the card to position the card for the next printing. This sequence of punch and stop continues down the card from printing to printing. The card material punched out with each printing is guided by a chute into a waste container where it is stored until it is discarded.

This approach has certain disadvantages. It requires a waste container for receiving material removed from the card and a chute for guiding the material to the container. The waste container must be emptied periodically. Individual pieces of punched-out material may become lodged in the machinery. Further, the card material between consecutive holes is weakened and is subject to tearing, which may cause loss of registration or cause the card to become jammed in the time clock.

SUMMARY OF THE INVENTION

Perforations are formed in a card on which printed information representing the time of day is to be recorded. The perforations are in the form of narrow slits which are made without removing material from the card. Each perforation is defined by intersecting surfaces which are inclined relative to each other along the thickness of the card and which terminate at the slit. The perforating means is essentially chisel-shaped to produce the perforation without removing material from the card. The means for sensing the perforations and maintaining the card in registry for the next printing is shaped to fit snugly in the perforation. Preferably, the sensing means is also chisel-shaped. A stop prevents the sensing means from protruding through the card.

It is an object of the present invention to provide a means for registering time cards in time recorders which uses fewer parts, eliminates punch-out waste, does not render the card vulnerable to tearing and which maintains the card in position without movement in relation to the printing means.

For the purpose of illustrating the invention, there is shown in the drawings a form which is presently preferred; it being understood, however, that this invention is not limited to the precise arrangements and instrumentalities shown.

DETAILED DESCRIPTION OF DRAWINGS

DETAILED DESCRIPTION OF INVENTION

Figure 1:
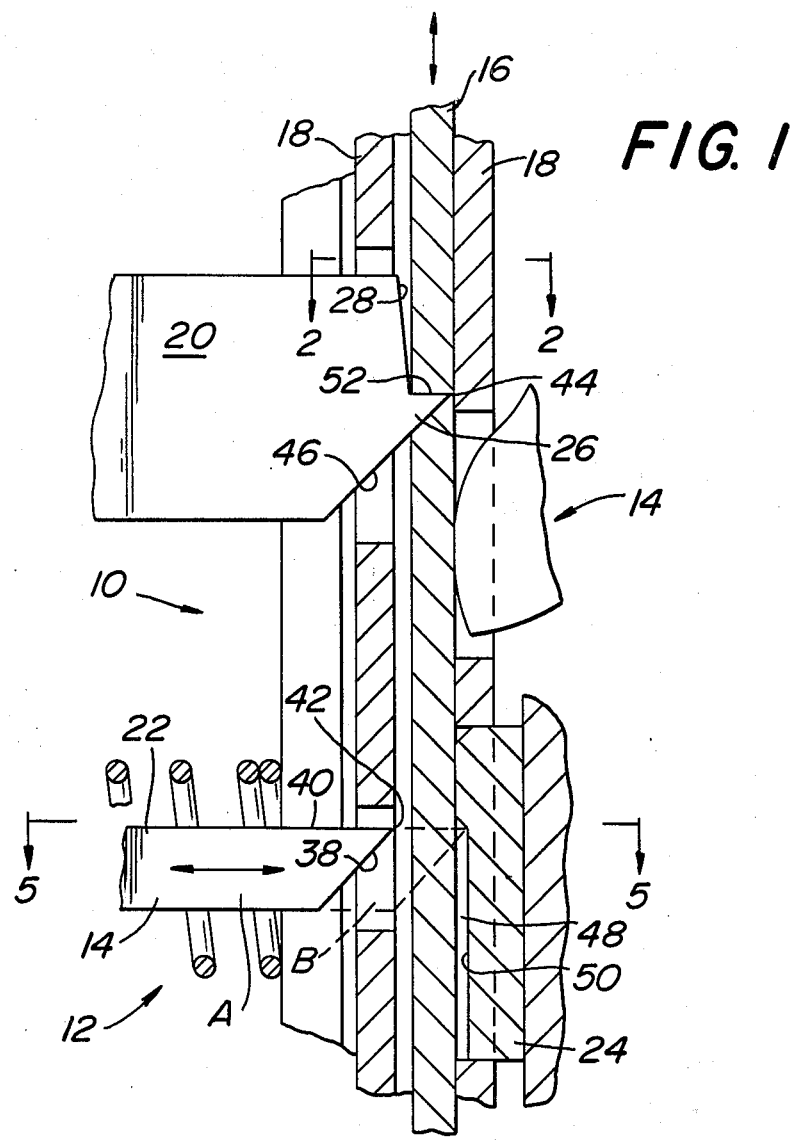
FIG. 1 is a diagrammatic representation of the invention showing the sensing means and the punch means.

Referring to the drawings, there is shown in FIG. 1 a diagrammatic representation of the invention generally indicated by the numeral 10. The invention consists of a punch portion 12 and a sensing portion 14.

The punch portion 12 consists of a punch 22 and a stationary anvil 24 having a relatively shallow cut-out portion 48. Punch 22 is chisel-shaped and is arranged and supported by suitable conventional means to be substantially perpendicular to the face of card 16 and substantially coplanar with a suitable printing means (not shown.) During insertion of a time card 16, punch 22 is held in a position indicated by the letter A (solid lines) behind a card guide 18 of conventional construction. During the printing operation, punch 22 is caused to move to position B (in phantom) such that the lateral edge 42 contacts the recessed surface 50 of cut-out portion 48, thereby perforating card 16 as described more fully below. Only the lateral edge 42 of punch 22 breaks the rear surface of the card, the edge being stopped by surface 50 when the card surface is broken. The punch may be caused to move to and away from card 16 by any suitably conventional means. After punching, punch 22 is withdrawn to position A.

Figure 3:
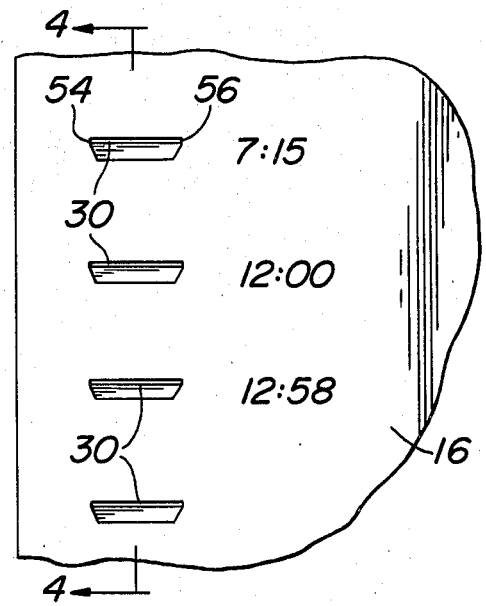
FIG. 3 is a detail of the card.
Figure 4:
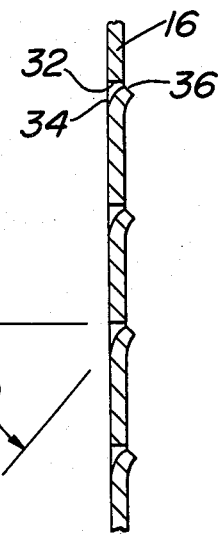
FIG. 4 is a sectional view taken along the line 4—4 in FIG. 3.
Figure 5:
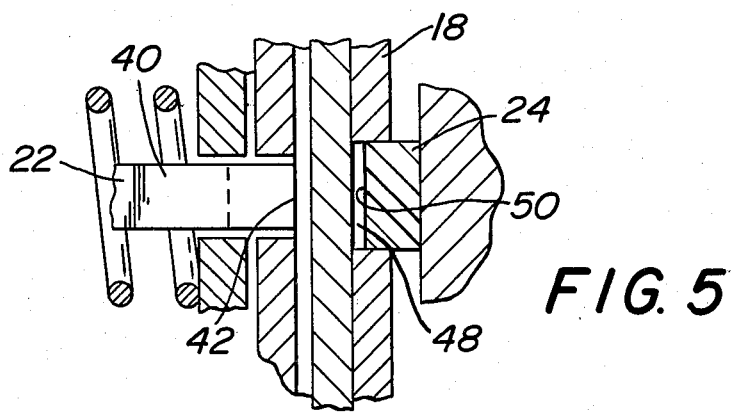
FIG. 5 is a sectional view taken along the line 5—5 in FIG. 1.

As shown more clearly in FIGS. 3 and 4, the punch 22 creates perforations 30 in card 16. Each perforation has a top surface 32 substantially perpendicular to the face of the card. The bottom surface 34 of the perforation 30 lies in a plane which is inclined to and intersects the plane of the top surface 32 at an acute angle $\theta$. On a subsequent insertion of the card, the last perforation 30 is used to sense the position of card 16 and maintain the card 16 in registry for printing while a new perforation 30 is formed co-linear with the newly printed information.

It should be noted that the punching operation results in the card fibers being broken without removing any material from the card. The punch 22 is chisel-shaped, so that punch surfaces 38 and 40 meet at a relatively sharp lateral edge 42 which penetrates the card and breaks the card fibers. The surfaces 38 and 40 then spread the fibers apart to deform the card by forming a depression in the card. The edge 42 continues to penetrate the card and breaks the card fibers at the rear surface to produce a narrow slit 36 at the rear of the depression where surfaces 32 and 34 terminate. No material is punched from the card.

Sensing is performed by a sensing pin 20, located above punch 22 and the printing means. Sensing pin 20 has a tip portion 26 which is substantially identical to the shape of punch 22. The width of sensing pin 20 is preferably 0.040 inch less than the width of punch 22. This permits a tolerance of 0.020 inch on each side of the sensing pin 20. Sensing pin 20 is also provided with a stop surface 28 above the tip portion 26 and displaced laterally from edge 44 by a distance substantially equal to the thickness of card 16. This permits tip portion 26 to contact the perforation surfaces 32 and 34 while stop surfaces 28 contacts the card face preventing buckling movement of the card in a direction substantially perpendicular to the card face. Sensing pin 20 is biased toward card 16 by suitable conventional means such as a spring (not shown), so that the card slidably contacts tip portion 26 during insertion, the tip portion engaging the card at the lowermost perforation 30 which is first encountered. When the card 16 is removed, the surface 34 (FIG. 4) of the card slidably contacts the surface 46 of tip portion 26 so that the card is easily and reliably disengaged from pin 20.

Figure 2:
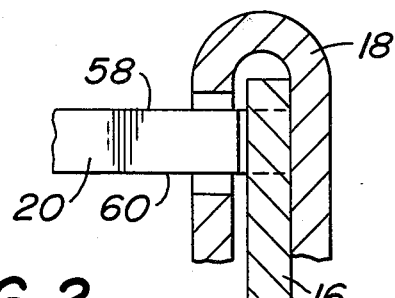
FIG. 2 is a sectional view taken along the line 2—2 in FIG. 1.

In operation, when a "clean" (i.e., unprinted and unperforated) card is inserted, there are no perforations for sensing pin 20 to engage. Thus the card 16 is inserted to its maximum depth. Time information is then printed on the card 16 by suitable conventional printing means. Simultaneously with the printing, punch 22 is caused to strike card 16 and perforate it in the manner described above. The perforation 30 is co-linear with the newly printed information. The punch 22 is then withdrawn and card 16 is removed. When card 16 is reinserted for a second printing, sensing pin 20 engages perforation 30 made at the previous printing. Tip 26 seats in perforation 30 and prevents further insertion of the card 16. The tip portion 26 is shaped such that surface 52 contacts substantially the entirety of card perforation top surface 32. See FIGS. 1,2 and 4. As described above, sensing pin 20 is preferably 0.040 inch narrower than punch 22. This tolerance permits lateral allowance for sensing pin 20 to locate card perforation 30 as the card is inserted. A tolerance is necessary to compensate for unavoidable variations in card width and manufacturing tolerances which could result in minor misalignment in the lateral plane. It will be observed that sensing pin 20 thus defines the horizontal position of the card while card guide 18 defines the lateral position. This maintains card 16 in registry so that the second printing can be made below the first printing substantially without movement of the card. The second printing is then made on the card 16 and a second perforation 30 is simultaneously made by punch 22. This sequence is then repeated for the length of the card.

It will be appreciated that this invention permits orderly sequential printing of the card in consecutive fashion from top to bottom. It will also be appreciated that the shape of the punch 22, sensing pin 20 and perforations 30 permits reliable seating of the pin 20 and printing while the card 16 is held in place. Furthermore, it will be appreciated that the punching operation does not create card waste and thereby eliminates the problems associated with handling and removing the waste. The conventional chute and waste container may be eliminated, reducing the number of parts and the cost of manufacture.

The present invention may be embodied in other specific forms without departing from the spirit or essential attributes thereof and, accordingly, reference should be made to the appended claims, rather than the foregoing specification, as indicating the scope of the invention.

I claim:

1. In a time recorder having printing means for recording information sequentially on a card, apparatus for aligning said card in registry with said printing means, comprising:
   deforming means for cutting the card fibers and spreading the card fibers as they are cut without removing material from the card to form one or more deformations in said card, and
   sensing means adapted and arranged to slidably engage undeformed portions of said card and to enter said one or more deformations and contact and support said card within said deformation.

2. Apparatus according to claim 1, wherein said deforming means comprises an anvil and a punch movable with respect to said anvil, said punch having an upper surface and a lower surface inclined with respect to said upper surface, the intersection of said upper and lower surfaces defining a cutting edge for cutting the card fibers and spreading the card fibers as they are cut without removing material from the card.

3. Apparatus according to claim 1, wherein said sensing means is provided with an upper surface for supporting the card within the deformation, a lower surface inclined with respect to said upper surface for contacting said card within the deformation, and a stop surface extending above said upper surface so as to contact said card above the deformation.

4. Apparatus according to claim 2, wherein said anvil has a recessed surface for receiving said cutting edge of said punch whereby said punch cutting edge breaks the rear surface of said card when said edge is received at said recessed surface of said anvil.

5. In a time recorder having printing means for printing information sequentially on a card, apparatus for aligning said card in registry with said printing means, comprising:
   deforming means for making one or more deformations in said card, each of said deformations being in the form of a relatively narrow slit and comprising an upper card surface substantially perpendicular to the front face of said card, and a lower card surface which is inclined with respect to said upper card surface, and said upper and lower card surfaces being spread apart so as to form a slit in the rear face of the card.
   said deforming means comprising an anvil and a punch movable with respect to said anvil,
   said punch having an upper surface and a lower surface inclined with respect to said upper surface, the intersection of said upper and lower surfaces defining a cutting edge for cutting the card fibers and spreading the card fibers as they are cut without removing material from the card,
   said anvil having a recessed surface disposed to face the card rear face for receiving said cutting edge of said punch so as to break the rear face of said card,
   sensing means for slidably engaging undeformed portions of said card and for entering said one or more deformations,
   said sensing means having an upper surface for contacting said deformation upper surface and supporting the card, a lower surface inclined with respect to said sensing means upper surface for contacting said deformation lower surface, and a stop surface extending above said sensing means upper surface for contacting said card above the deformation.

6. Method of aligning a time card in registry with a printing means, comprising:
   providing a card having one or more deformations each comprising a relatively narrow slit at the rear face of the card, an upper surface, and a lower surface inclined with respect to said upper surface, said upper and lower surfaces terminating at said slit;
   providing a sensing element having upper and lower surfaces inclined with respect to each other;
   moving the sensing element into a deformation so as to bring the sensing element surfaces into deformation upper and lower surfaces to support said card.

7. In a time recorder having printing means for recording information sequentially on a card, apparatus for aligning said card in registry with said printing means, comprising:
   deforming means provided with a cutting surface for cutting the card fibers and spreading the card fibers as they are cut without removing material from the card to form one or more deformations in said card, said deforming means comprising an upper planar surface and a lower planar surface inclined with respect to said upper surface, the intersection of said upper and lower surfaces defining said cutting surface, and
   sensing means adapted and arranged to slidably engage undeformed portions of said card and to enter said one or more deformations, said sensing means having an upper planar surface for contacting and supporting said card within said deformation, a lower planar surface inclined with respect to said sensing means upper surface and a stop surface extending above said sensing means upper surface disposed so as to contact the card front face when said sensing means enters said deformation.

8. Apparatus according to claim 7, wherein said deforming means and said sensing means are positioned substantially in alignment parallel to the direction of movement of the card in the recorder.

9. Method of aligning a time card in registry with a printing means comprising:
   moving a punch in a direction substantially perpendicular to said card such that said punch cuts the card fibers and spreads the card fibers as they are cut without removing material from the card to form a deformation having an upper surface and a lower surface inclined with respect to said upper surface, said upper and lower surfaces terminating at a slit, and
   supporting said card at a deformation by contacting substantially the entire deformation upper and lower surfaces by moving a sensing surface into said deformation in a direction substantially perpendicular to the card face such that said sensing surface contacts substantially the entire deformation upper and lower surfaces.

* * * * *